United States Patent [19]

Neumann

[11] 4,322,838
[45] Mar. 30, 1982

[54] DYNAMIC FOCUS ADJUSTMENT FOR TRANSMISSIVE OR REFLECTIVE OPTICAL DISC MEMORY SYSTEMS

[75] Inventor: Hans D. Neumann, Los Altos, Calif.

[73] Assignee: Hewlett-Packard Company, Palo Alto, Calif.

[21] Appl. No.: 120,589

[22] Filed: Feb. 11, 1980

[51] Int. Cl.³ .............................................. G11B 7/00
[52] U.S. Cl. ..................................... 369/45; 369/112; 350/255; 250/201
[58] Field of Search ................. 179/100.1 G, 100.3 V; 250/201; 350/255, 186, 428, 430; 365/120; 369/45, 44, 112, 110, 43; 358/128.5

[56] References Cited

U.S. PATENT DOCUMENTS

| | | | |
|---|---|---|---|
| 3,861,786 | 1/1975 | Badgett | 350/255 |
| 3,911,209 | 10/1975 | Bouwhuis | 179/100.3 V |
| 3,944,727 | 3/1976 | Elliott | 179/100.1 G |
| 4,003,059 | 1/1977 | Suqiura | 179/100.1 G |
| 4,030,815 | 6/1977 | Andrevski | 350/255 |
| 4,051,529 | 9/1977 | Miyaoka | 179/100.1 G |

FOREIGN PATENT DOCUMENTS 1441358  6/1976  United Kingdom ................. 369/45

Primary Examiner—Bernard Konick
Assistant Examiner—Alan Faber
Attorney, Agent, or Firm—Ronald E. Grubman

[57] ABSTRACT

An optical disc reader is provided in which automatic focussing is achieved by movements of elements completely removed from the moving head which travels across the optical disc.

6 Claims, 3 Drawing Figures

DYNAMIC FOCUS ADJUSTMENT FOR TRANSMISSIVE OR REFLECTIVE OPTICAL DISC MEMORY SYSTEMS

BACKGROUND OF THE INVENTION

The purpose of the principal objective lens in optical disc readers is to project a light spot of specified size (sometimes the minimum attainable) on an optically responsive information recording plane. This requires that the distance from objective to filmplane be accurately set for best focus and maintained there, even in the presence of physical disturbances. In the case of an optical read-only memory (OROM), these disturbances include axial runout and disc warpage, disc thickness variations, and environmentally-induced variations of critical optical distances. In order to compensate the optical system for these disturbances, an automatic focus adjustment system must generate a focus error signal and physically adjust the optical system to restore optimum focus.

In the prior art, including video disc devices, access to a particular data location is typically provided by a lead-screw or rack-and-pinion driven sled, which carries the entire optical system. The autofocus mechanism consists mainly of an electromagnetic or a pneumatic positioner and the principal objective lens. The positioner adjusts the axial distance between lens and information recording plane in response to a control input which is developed from the focus error signal. Such an arrangement is not usable on fast optical memory discs because it cannot satisfy the requirements for both rapid random data access and focus tracking at high rotational disc speeds.

In U.S. Pat. No. 4,051,529, entitled, "Focus Control System with Movable Mirror", the autofocus mechanism consists of a movable mirror located in the optical path between a light source and the principal objective lens. Movement of the mirror in response to a focus error signal compensates for variations in the critical optical pathlengths. In the prior art device, however, the total optical distance between movable mirror and optical recording medium is fixed, except for minor variations caused by the mirror motion. This is necessitated by the use of converging lenses in the system which establish an intermediate focal point between movable mirror and optical recording medium. Thus, in this prior art device, it is required that the entire optical system be carried on the sled. Such an arrangement would not be suitable for a random-access system, such as an OROM, since the mass of the optics would prevent the rapid lateral accessing motions of the sled required to achieve random access.

SUMMARY OF THE INVENTION

In accordance with the illustrated preferred embodiments, the present invention provides an optical disc reader with an autofocus mechanism suitable for use on fast-turning, random-and rapid-access optical disc readers such as an OROM. The focussing function is performed by movements of elements completely removed from the mechanical sled providing random-access to the OROM. It is thereby ensured that the device may be rapidly moved laterally across the OROM, while continuously maintaining proper focus.

In a preferred embodiment, the moving head is driven by a parallelogram suspension consisting of two flexible members and two rigid connecting links, one free but one rigidly mounted on the instrument base, the principal objective lens(es) being mounted on the free link. This suspension provides friction-free travel of the objective over the data field and reduces the mass of the moving components to a minimum. The flexure-supported optical head yields minimal access times to the recorded data, being most efficient where the required travel is small, i.e., a few millimeters.

DESCRIPTION OF THE PREFERRED EMBODIMENT

Figure 1:
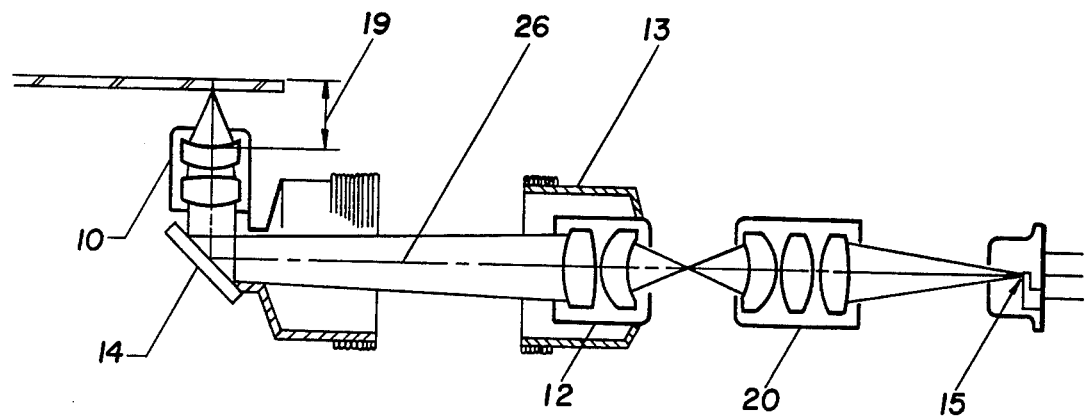
FIG. 1 is a side view of the optical system in an optical disc memory system according to the principles of the present invention.
Figure 2:
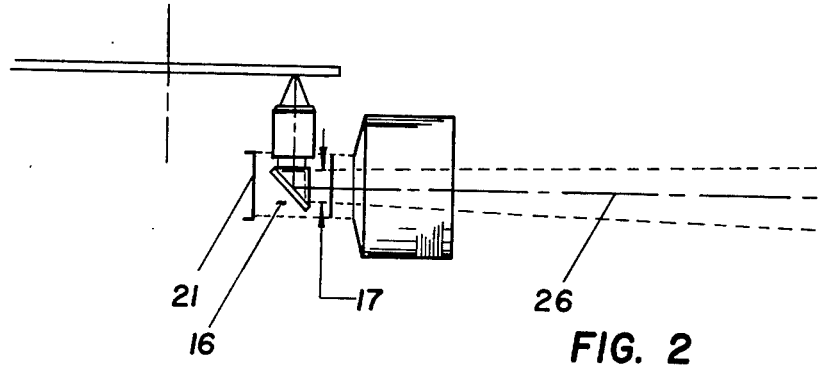
FIG. 2 is a side view of the suspension of FIG. 1.
Figure 3:
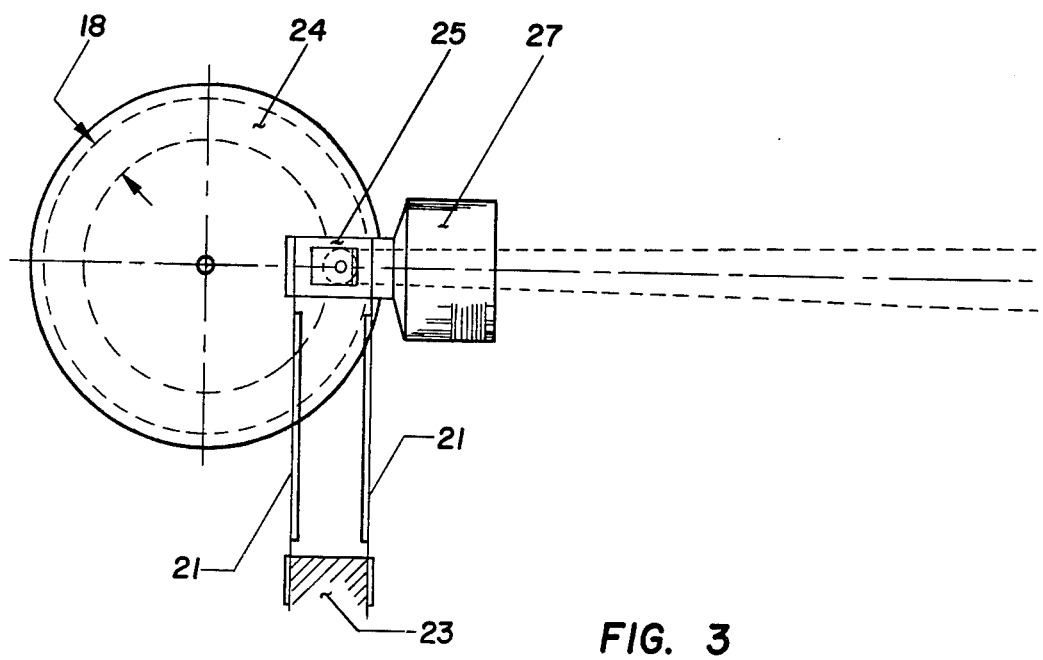
FIG. 3 is a top view of the parallelogram suspension of an objective lens in an optical disc memory system constructed according to the principles of the present invention.

Referring to FIGS. 1, 2, and 3, light from a source 15, such as a laser source, is focussed by a condenser 20 and projected towards an objective lens 10 by a collimator 12. The collimated beam 26 is intercepted by a mirror 14 mounted on an objective carrier 16 at an angle of 45 degrees with respect to the axis of objective 10. The collimation of the beam ensures that the optical pathlength between collimator 12 and objective lens 10, the traveling objective, is uncritical, and therefore does not cause a shifting of the focal position at the surface of an optical recording medium 24, such as an OROM. This enables collimator 12 and light source 15 to be completely removed from sled 16. In practice, the beam cannot be perfectly collimated so to provide non-criticality of optical pathlength, collimator 12 provides a weakly convergent beam which diffractively widens along its path length. This broadening of the convergent beam results in a region of the beam of narrowest diameter, which shall be denoted as a "waist", shown as 17 in FIG. 2. In general, beam 26 would be convergent down to the diameter of waist 17, and then divergent thereafter. However, as shown in FIGS. 1 through 3, the apparatus is arranged to position waist 17 at or near the midpoint of the path traversed by sled 16 across OROM 24, and is of a width to slightly underfill principal objective 10.

During operation, numerous factors may cause defocussing of the beam emergent from lens 10 with respect to OROM 24. Thus, such factors as axial runout, disc warpage, disc thickness variations, and temperature variations may all change slightly the back focal distance. Upon such occurrence, a focus error signal is generated, e.g., by one of several possible techniques: (1) detection of astigmatism in the reflected light beam; (2) monitoring the phase of the diffraction pattern as a function of bit-cell motion; (3) measuring the amplitude of the second derivative of the data signal; or (4) measuring the balance of illumination on a split detector.

The focus error signal controls a focus motor 13 which causes axial translation of collimator 12. The required compensation movement ($\Delta s$) of collimator 12 is related to the focus error ($\Delta f$) at filmplane 24, by the square of the conjugate distance ratio, $C_R$, i.e., the square of the magnification between collimating lens 12 and objective lens 10. $C_R$ is itself equal to the ratio of the effective focal lengths of collimator 12 and objective 10, and may be set to unity by using identical lenses on both ends. Consequently, a small focus error at the objective is corrected by axial movement of equal magnitude and opposite sign at the collimator.

Certain trade-offs are possible with this scheme. By placing a long conjugate at objective 10, and a short one at collimator 12, the required corrective movement is proportionally smaller. The dynamic response of the autofocus system is thus improved by the shorter stroke required of the focus motor. However, for this configuration to be practical, the performance requirements of the optical system must allow the use of a "slower" objective, i.e., if the spot size at the disc need not be the smallest attainable. For the specific requirements of an OROM, a ratio of $\Delta s/\Delta f = 0.3$ appears to be a practical minimum. This value corresponds to the use of relative apertures f/2.4 and f/1.3 for the objective and collimator, respectively.

In a particular preferred embodiment, objective carrier 16 is driven by a parallelogram suspension including a link 23 fixedly mounted on a base, and a free link 25 carrying sled 16. The two links are connected by flexible connecting members 21, such as a pair of ligaments fabricated from beryllium copper or a spring alloy of high fatigue strength. Objective carrier 16 travels within the flexure range above a data field 18 on OROM 24 in response to a flexure drive 27, which can be any known method of deflecting a flexible member such as a "voice coil", moving magnet, or other type of linear motor.

I claim:

1. A focus control system for maintaining focus of a spot of light on an optical recording medium, comprising:

a source of a beam of light;

moving means movably positioned adjacent the surface of said optical recording medium for performing translational motion across a portion of said optical recording medium;

a focussing lens mounted on said moving means, for directing said light beam to the surface of said optical recording medium to form a focussed spot of light thereon; and focus error correcting means operating in response to an error signal representing any change of focus of said spot of light on said surface to cause refocussing of said spot on said surface, said focus error correcting means being positioned remote from said moving means.

2. A focus control system as in claim 1 wherein said focus error correcting means comprises:

a correcting lens;

driving means operating in response to said error signal to cause linear translation of said correcting lenses, to re-focus said spot on said surface.

3. A focus control system as in claim 2 wherein said correcting lens comprises a collimating lens.

4. A focus control system as in claim 3 wherein said moving means comprises:

a base;

a fixed link mounted on said base;

a sled;

a free link connected to said sled; and a pair of flexible connecting members interconnecting said free link and said fixed link.

5. A focus control system as in claim 4 wherein the ratio of the focal length of said correcting lens to said focussing lens is in the range 0.3 to 1.0.

6. A focus control system as in claim 2 wherein the ratio of the focal length of said correcting lens to said focussing lens is in the range 0.3 to 1.0.

* * * * *